United States Patent
Parsonnet et al.

(10) Patent No.: US 12,229,164 B1
(45) Date of Patent: Feb. 18, 2025

(54) MULTIVARIATE TIME-SERIES SEARCH AND CLASSIFICATION LEARNING METHODS AND SYSTEMS

(71) Applicant: Seeq Corporation, Seattle, WA (US)

(72) Inventors: Brian Parsonnet, Fort Collins, CO (US); Joseph R. DiSantis, Houston, TX (US); Aswin N. Venkat, Belmont, CA (US)

(73) Assignee: Seeq Corporation, Seattle, WA (US)

( * ) Notice: Subject to any disclaimer, the term of this patent is extended or adjusted under 35 U.S.C. 154(b) by 0 days.

(21) Appl. No.: 17/022,772

(22) Filed: Sep. 16, 2020

Related U.S. Application Data

(60) Provisional application No. 62/901,075, filed on Sep. 16, 2019.

(51) Int. Cl.
*G06F 16/28* (2019.01)
*G06F 16/23* (2019.01)
*G06F 16/2458* (2019.01)
*G06N 20/00* (2019.01)

(52) U.S. Cl.
CPC ........ *G06F 16/285* (2019.01); *G06F 16/2379* (2019.01); *G06F 16/2474* (2019.01); *G06N 20/00* (2019.01)

(58) Field of Classification Search
CPC ............... G06F 16/285; G06F 16/2379; G06F 16/2477; G06F 16/2474; G06F 16/2264; G06F 16/355; G06N 20/00
See application file for complete search history.

(56) References Cited

U.S. PATENT DOCUMENTS

| | | | | |
|---|---|---|---|---|
| 9,262,726 | B2* | 2/2016 | Cantwell | G06N 3/063 |
| 2009/0265106 | A1* | 10/2009 | Bearman | G06Q 10/00 |
| | | | | 701/300 |
| 2010/0250473 | A1* | 9/2010 | Porikli | G06N 20/10 |
| | | | | 706/20 |
| 2014/0247206 | A1* | 9/2014 | Grokop | G06F 1/3287 |
| | | | | 345/156 |
| 2015/0112900 | A1* | 4/2015 | Ariyoshi | G06N 20/00 |
| | | | | 706/46 |
| 2016/0342903 | A1* | 11/2016 | Shumpert | G06F 11/008 |
| 2016/0342906 | A1* | 11/2016 | Shaashua | H04L 67/306 |

(Continued)

FOREIGN PATENT DOCUMENTS

WO   WO-2019022737 A1 *   1/2019   ............. G06F 11/00

*Primary Examiner* — Jensen Hu
(74) *Attorney, Agent, or Firm* — Polsinelli PC; Derek D. Donahoe

(57) ABSTRACT

A system for processing multivariate, time-series data to classify portions of the data corresponding to an identified event or condition. Time periods of interest may be identified as search criteria for a variety of purposes. As an example, an event or condition may occur, whereby, precursors to the event or condition may be present in the time-series data, and thereby be a time period of interest as a predictor of future occurrences. As another example, the state of the system during normal operation may be identified. Based on the provided data, the processing system may output a prediction or a likelihood of a re-occurrence of the condition. One or more actions may be taken in response to the output of the system to prevent the occurrence of the condition or otherwise respond to the possibility of the occurrence of the condition.

28 Claims, 8 Drawing Sheets

(56) References Cited

U.S. PATENT DOCUMENTS

2017/0228661 A1\* 8/2017 Chien .................. G06F 16/285
2018/0136000 A1\* 5/2018 Rasmusson, Jr. .... G05D 1/0044
2019/0340392 A1\* 11/2019 Khorrami .............. G06F 21/71

\* cited by examiner

MULTIVARIATE TIME-SERIES SEARCH AND CLASSIFICATION LEARNING METHODS AND SYSTEMS

CROSS-REFERENCE TO RELATED APPLICATION

This application is related to and claims priority under 35 U.S.C. § 119 (e) from U.S. Patent Application No. 62/901,075 filed Sep. 16, 2019 entitled "Multivariate Time Series Search and Classification Learning Methods and Systems," the entire contents of which is incorporated herein by reference for all purposes.

TECHNICAL FIELD

This application relates to systems and methods for processing time-series data and, more particularly, for classifying portions of a multivariate time-series data corresponding to an identified event or condition of historical or streaming multivariate time-series data and/or generating context for such multivariate time-series data.

BACKGROUND

A manufacturing system, a chemical processing plant, a car, airplane, train or other transportation system, a computer network, a stock exchange, a building HVAC system, or even a human in a hospital are increasingly likely to have sensors or measurements which monitor and provide data indicative of performance. These readings may be stored for analysis, either immediately or in the future, where each reading is recorded along with a timestamp (and possibly other metadata). This stream of data is often referred to as time-series data, but other terms exist as well, and the data store may be called a data historian, but again, multiple terms are used.

Sensor measurement and analysis can serve many purposes such as condition monitoring, safety, reliability, optimization, supply chain automation, modeling, change detection, and equipment failure prediction, to name a few. The sensor data or other readings are often insufficient by themselves, individually or in aggregate, to ensure correct conclusions about the system state, so the time-series data is combined with other data or information to improve the analysis. This is often called contextualization. The other data sources may include other systems, weather data, maintenance data, control information, or human input. Human input can be in the form of additional data, equations, rules, or observations.

Sometimes context can be inferred directly from the time-series data. As an example, if you as a driver of a manual transmission car looked at the indicators on the dash, you could infer whether you are moving, idling, or turned off. With additional effort, you might distinguish between coasting downhill at 50 MPH, or powering up a hill at that same speed. Other information (not on the dash), such as knowledge of how your feet are operating the pedals, can add substantial context to enable these inferences. But with sufficient sensing and more complex analysis, even these example inferences could be made solely from the dashboard indicators. The ratio between rpm and speed might inform the determination of gear. In combination with GPS data, one might infer information about traffic. Instantaneous gas consumption readings with rpm and speed might indicate road grade.

While these examples seem straightforward, it is often the case that an operator may not know exactly how to examine the data. There are many characteristics and types of relationships that could be useful—the sensor values themselves, their distribution over time, dynamic behavior, frequency spectrum characteristic, multi-dimensional relationships, patterns of behaviors, etc. Ultimately, an operator may not know the method by which an inference can be made, and the operator may not have expertise in making such calculations. But the operator does know the car and many of its normal and abnormal behaviors It is with these observations in mind, among others, that various aspects of the present disclosure were conceived.

SUMMARY

An aspect of the present disclosure may include a system comprising a processing device and a non-transitory computer-readable medium encoded with instructions that, when executed by the processing device, cause the processing device to perform certain operations. Such operations may include identifying a first portion and/or a second portion of an ordered data series, wherein the first portion comprises a first identifiable characteristic of the ordered data series and the second portion comprises a second identifiable characteristic of the ordered data series and invoking a detector based on the ordered data series, the detector configured to identify and obtain features of the ordered data series, the features corresponding to the first identifiable characteristic and the second identifiable characteristic. The operations may also include outputting an identification, based on the obtained features, of a results period of the ordered data series, the results period occurring after the first portion and the second portion and comprising a portion of the ordered data series including the first identifiable characteristic and excluding the second identifiable characteristic.

Another aspect of the present disclosure may include a method for processing time-series data comprising the operations of identifying, using a processor in communication with a non-transitory computer-readable medium encoded with instructions, a first period of disinterest comprising a first portion of an ordered data series, the ordered data series comprising one or more dimensions, wherein the first portion of the ordered data series includes characteristics of disinterest and invoking a detector based on the ordered data series and the first period of disinterest, the detector configured to identify and process one or more features of the ordered data series, each feature corresponding to at least one of the characteristics of disinterest. The method may further include identifying a results period of a searchable ordered data series using the detector, the results period comprising a portion of the searchable ordered data series matching the first period of disinterest and updating the detector with an inclusion limiter for unclassified time periods, the inclusion limiter based on one or more of a volume or percentage score.

Yet another aspects of the present disclosure may include a system comprising a processing device and a non-transitory computer-readable medium encoded with instructions. The instructions cause the processing device to, given an ordered data series and associated classification data for identified portions of the ordered data series, automatically configure one or more detectors and one or more classifiers to classify portions of the ordered data series to match the associated classification data. Still another aspect may include a method for monitoring a system comprising the operations of obtaining classification data for one or more identified portions of an ordered data series, the classification data corresponding to a point of interest within the ordered data series and configuring one or more detectors to obtain features of the ordered data series as input to one or more classifiers to classify portions of the ordered data series to match the associated classification data.

Still other aspects may include updating the classification data based on prior classified portions of the ordered data, wherein the prior classified portions comprise an annotation of a reinforcement or a correction of an accuracy of the match to the associated classification data. Further, automatically configuring the detector may include at least one of, based on feedback information, altering a parameter of the detector, invoke a detector, delete a detector, or combine an output of a plurality of detectors and automatically configuring the classifier may include at least one of, based on feedback information, altering a parameter of the classifier, invoke a classifier, delete a classifier, or combine an output of a plurality of classifiers. In some instances, the ordered data series is time series data and the classification data corresponds to a discrete sequence of the time series data and may comprises a time period preceding the discrete sequence within the ordered time series, the time period predictive of a point of interest in the time series data.

Identification of the classification data may be received via a user interface and/or may be based on identification of on one or more characteristics corresponding to the identified portions of the ordered data series and matching the one or more characteristics to the ordered data series. Matching the one or more characteristics to the ordered data series may include at least one of a determination of a reinforcement or a correction of an accuracy of the match to the associated classification data and identification of one or more characteristics and matching the one or more characteristics to the ordered data series may occur during an unsupervised learning period.

The classification data may be associated with a portion of interest of the ordered data series, associated with a portion of disinterest of the ordered data series, or associated with a portion of interest and a portion of disinterest of the ordered data series. Further, the one or more detectors and one or more classifiers may classify portions of one of the ordered data series, a historical data series comprising stored data values, or a real-time data series comprising one or more data streams comprising real time data values.

In some instances, the one or more classifiers comprise one or more of an empirical model, a first principles model, or a rules-based model. The system may also receive a specification of a greediness value associated with the one or more classifiers, the greediness value associated with classifying the portions of the ordered data series as matching the associated classification data and receive a specification of a robustness value associated with the one or more classifiers, the robustness value associated with classifying the portions of the ordered data series to minimize sensitivity to varying specifications of greediness.

BRIEF DESCRIPTION OF DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

Corresponding reference characters indicate corresponding elements among the views of the drawings. The headings used in the figures should not be interpreted to limit the scope of the claims.

DETAILED DESCRIPTION

Figure 1:
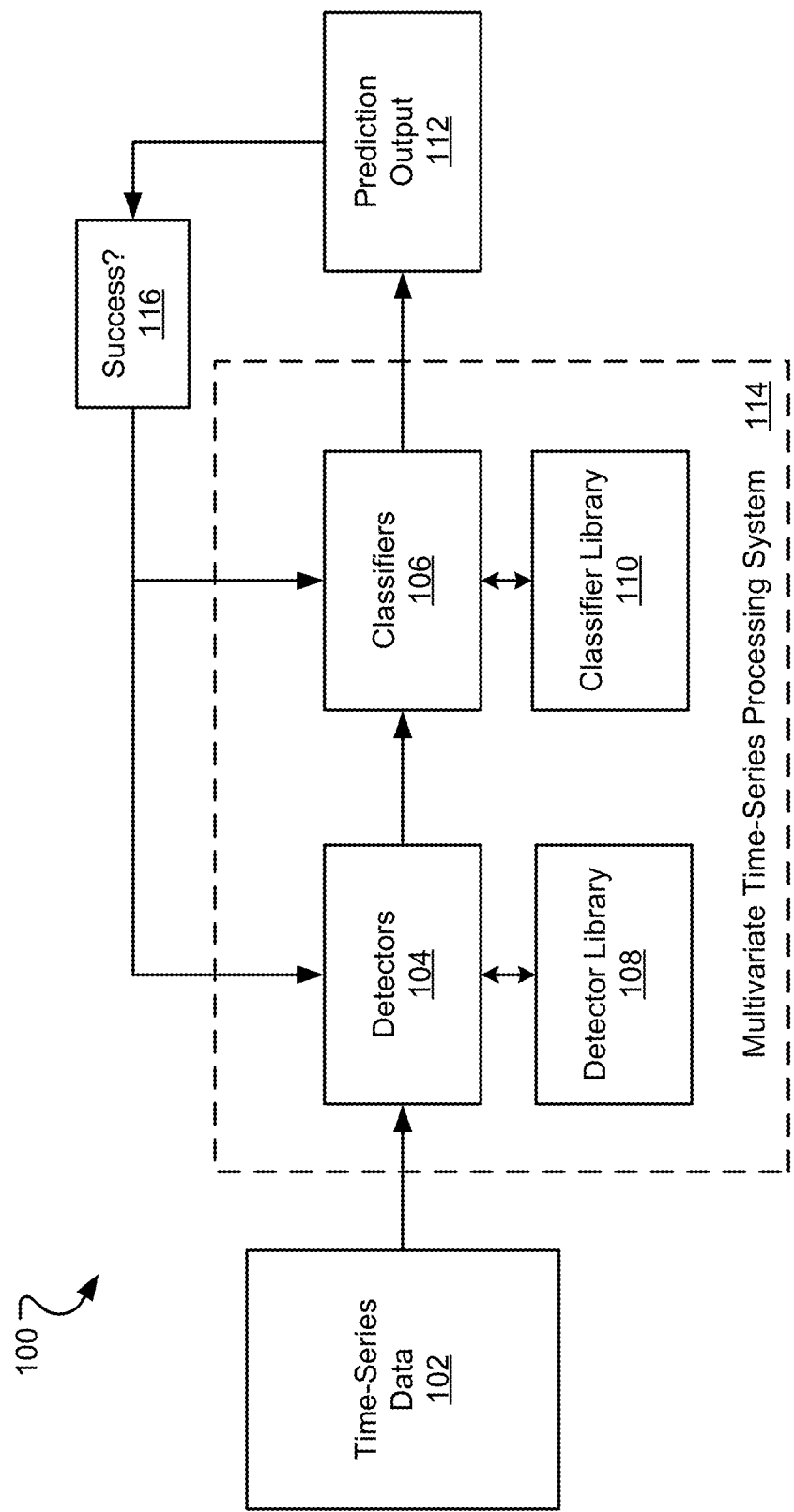
FIG. 1 is a schematic illustrating a system for processing multivariate, time-series data to classify a condition based on the data.

Time-series data, or other types of ordered data series, and particularly collections of time-series data for various aspects of a system (e.g., different sensor readings), which may be stored in a time-series data store, contains rich information about the state of the system being represented by the various time-series data sets. However, the rich information contained in a set of time-series signals is not readily apparent from the discrete sets of signals. Rather, the system state may be defined by unknown and directly unobservable functions of multivariate time-series signals, with both time and frequency characteristics. Understanding of the state of a system may be enhanced through analysis of such derived data.

Consumers of time-series data often have a need to identify and characterize periods of data that have a similar system state, or to classify a system state of interest. This period may, for example and without imputing limitation, represent a desirable or undesirable period of operation in a manufacturing facility, a time period preceding a failure event of a piece of equipment, a time period deserving further scrutiny, or even time periods of no interest. Consumers of time-series data may lack the capability to directly extract the rich information contained within the data. System and/or data dynamics, lags, and/or dimensionality, for example, may make the problem especially complex.

A detector-based framework may enable analytical methods to generate and return the results of a search over time-series data. As a result, a human user or an automated algorithmic method may provide time periods as search criteria, herein referred to as "A" periods or as "FIND" periods, to which the state of the system during other periods of time within the range of investigation may be matched and aggregated into a search result. In some embodiments, these features are identified by the user. In other embodiments, the features of the data are identified according to the techniques described herein. The generated features of the data may be general or based on characteristics of the system. Examples of general features include, for example and without imputing limitation, $n^{th}$ derivative, autocorrelation, statistical moments, etc. Features can also be based on the system and/or asset types. For example, a compressor asset may utilize polytrophic head balance or speed as asset-specific features. In some other embodiments, a combination of user-provided and generated features may be used.

In various embodiments, features may be computed from individual data points, multiple data points over multiple sensors at related times, or over data sets distributed over some static or shifting dimension (e.g., a time window, etc.). In some embodiments, an optimal window size may be learned (e.g., by a machine learning model) for feature computation.

In various aspects, the present disclosure provides systems and methods for processing of multivariate, time-series data to predict the occurrence of a condition based on the data. As mentioned above, time periods or other classification data may be provided to the system as search criteria to identity or predict future occurrence corresponding to the search criteria. For example, an event or condition (such as a device failure, a monitored condition exceeding a threshold value, an environmental condition, a system output, or other points of interest within an ordered data series) may occur and one or more precursors for the event or condition of interest may be identified within the time-series data. In one instance, the classification data may include a period which precedes the failure, identified as the "A" period or "FIND" period, can be manually identified. In other instances, only the point of failure may be identified, and "A" may be automatically determined as the time-series data immediately preceding the point of failure. In still other instances, "B" conditions, or "AVOID" periods, representing the state of the system during normal operation as obtained from the time-series data and after the failure has been repaired may be identified, either manually or automatically, to further inform the method or system.

Upon identification of the "A" (and possibly "B") classification data, time-series data from a monitored system may be provided to a multivariate, time-series processing system to identify system state or states preceding the identified condition. For example, monitored operational data from a system may be provided to the processing system. Based on the provided classification data, the processing system may output a prediction or a likelihood of a re-occurrence of the condition, such as a failure of the system or a monitored condition of the system exceeding a threshold value. One or more actions may be taken in response to the output of the system to prevent the occurrence of the condition or otherwise respond to the possibility of the occurrence of the condition. In this manner, the processing system may process the multivariate, time-series data received from the monitored system and provide an output associated with a prediction of an occurrence of the monitored system based on the provide time-series data.

In one particular implementation, the time-series processing system may include one or more data extractors, or "detectors", to obtain particular features of the time-series data. In some instances, the features may be the values of one or more of the data streams of the time-series data. In other instances, the data features may include derivations of the data streams of the time-series data, such as a maximum value, a minimum value, an average value, a mean value, and the like. In some instances, the detectors may obtain such features from an analysis window of the time-series data, such as over a ten second span of the time-series data. The analysis window may slide along the time-series data to obtain a time-series of features of the data from the raw time-series data provided to the processing system. Regardless of the types of features extracted, the detectors may provide the extracted data to one or more models, or "classifiers". The classifiers may model the extracted feature data in various configurations and output a prediction or likelihood of the indicated occurrence. In some instances, one or more weighted values may be applied to the classifiers or the output of the classifiers to improve the accuracy of the prediction output. The weighted values may be determined over time through one or more machine learning procedures, discussed in more detail below.

In some instances, the number and/or types of detectors may be selected or obtained by the processing system with minimal input from a user of the processing system. Similarly, the number and/or types of classifiers may be selected or obtained by the processing system with minimal input from a user of the processing system. For example, the processing system may include a library of available detectors and/or a library of available classifiers from which the processing system may select to tailor the processing of the time-series data. Based on feedback information indicating a success of a predicted outcome, the processing system may select detectors and/or classifiers from the respective libraries to alter the processing of the time-series data provided to the system. In this manner, the detectors and/or classifiers used by the processing system may be extensible at configuration of the system or in response to feedback information associated with the system output. In addition, the feedback information may or may not be provided by a user of the system. For example, a user may indicate if a prediction of the occurrence of the event is accurate or inaccurate. In another example, a sensor may monitor for the occurrence of the event and provide a success or failure indication to the processing system. Regardless of how the feedback information is provided, the processing system may be optimized to predict a particular occurrence based on an indication of a successful or failed prediction. In other words, the detectors selected to obtain particular features from the time-series data and/or the classifiers selected to determine a prediction output may not be selected by a user. Rather, the processing system may execute machine learning techniques to determine the characteristics of the time-series data obtained by the detectors and the models, or classifiers that best predict the occurrence of the event to improve the system output.

Figure 2:
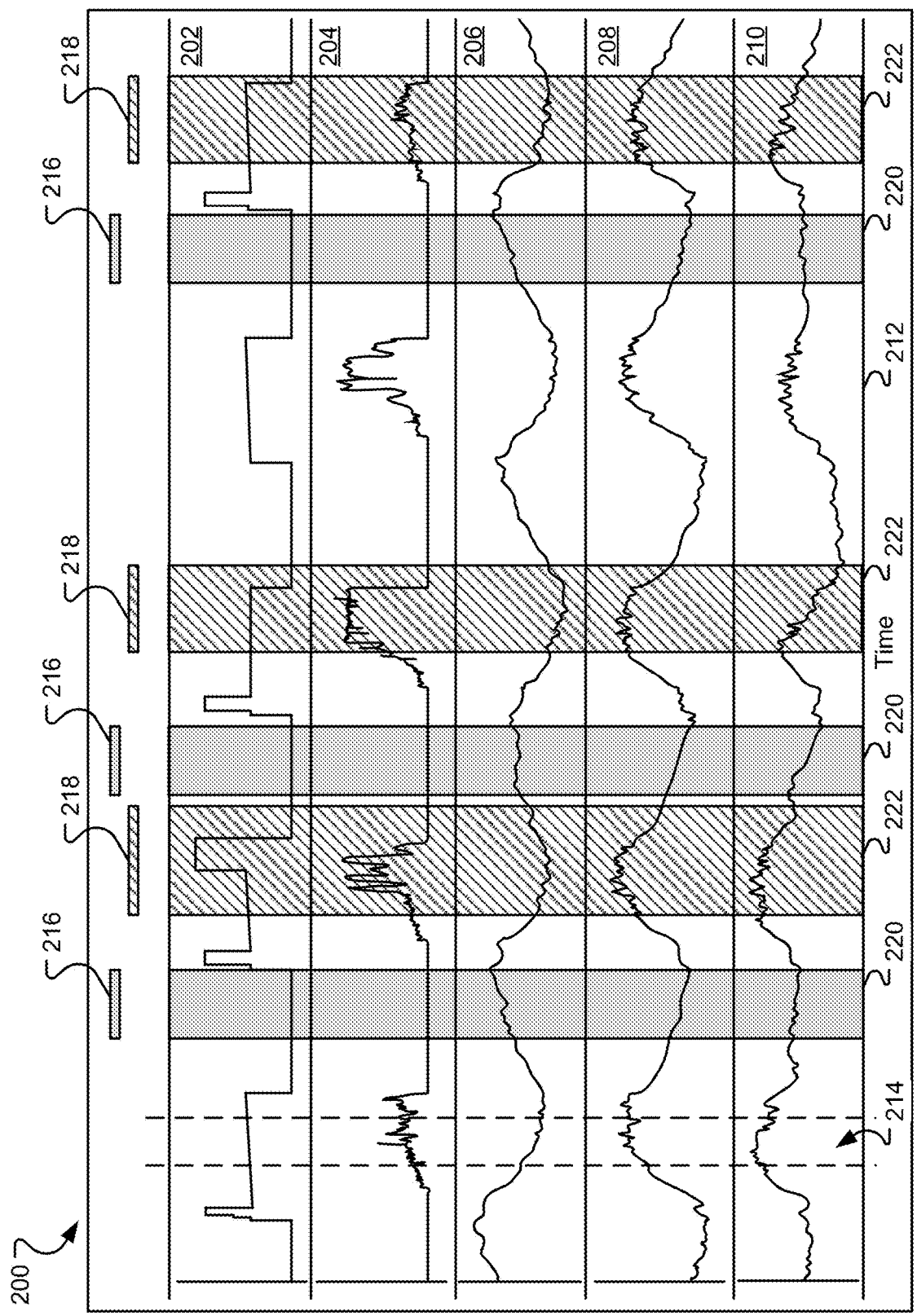
FIG. 2 is a graph of example time-series of data from a monitored system.

FIG. 1 is a schematic illustration of a computing system 100 for processing multivariate, time-series data to predict a condition or event based on the data. In general, the system 100 includes time-series data 102 received from a monitored system, such as a computing device, a manufacturing system, a network of devices, etc., and provided to a multivariate, time-series processing system 114. One example of such time-series data 102 is illustrated in the graph 200 of FIG. 2. More particularly, the graph 200 includes five examples of time-series data 202-210. In one instance, each of the time-series data sets 202-210 may be provided to the processing system 114, with the sets from one or more sensors obtaining data or information from the monitored system, although the data streams 202-210 may be from any source associated with a monitored system. Further, although five sets of time-series data 202-210 streams are illustrated in FIG. 2, it should be appreciated that the processing system 114 may receive any number of time-series data streams 202-210 from any number of sources associated with the monitored system. Each data stream 202-210 is shown along a timeline 212 to illustrate the data as an input stream. As should be appreciated, the time-series data streams 202-210 may extend into the past or the future beyond that illustrated in FIG. 2 as the data streams may be a continuous stream of data.

In this manner, the processing system 114 may use continuous time-series signals, a combination of continuous and categorical (discrete) time-series signals, and/or a multitude of unstructured data such as written operator logs, operating procedures, etc., used in combination with continuous and discrete signals. In some instances, time-series data can itself be multi-dimensional, meaning, each timestamp is associated with not just one value, but a set of values of arbitrary nature. Examples may include, without imputing limitation, image data, whereby an image as a whole is represented by a single time-stamp, yet the data at that time might be readily represented on an X-Y grid (e.g., an image file). Another example would be a time-series of time ranges, where a time window or time period is defined and given a single timestamp as a pair. In effect, time-series data of any dimension may be used to generate FIND periods or the like. For the sake of explanation, a time-stamp can be used as an indexing dimension in all the examples above. However, it will be understood by a person having ordinary skill in the art that a length, a frequency, or any ordered identifier may be used as an indexing dimension, including aggregate or multi-dimensional indexing dimensions.

Returning to FIG. 1, the time-series data 202-210 may access the multivariate time-series processing system 114 for processing. In general, the processing system 114 may include one or more detectors 104 to extract various features of the time-series data, such as a maximum value, a minimum value, an average value, a mean value, and the like. In general, detectors are algorithms or methods for identifying characteristics of time-series data, either individually or in aggregate, at a single time stamp or over a time window, over arbitrary dimensionality, and over any indexing dimension (nominally, time). Those characteristics are broadly imagined; examples include median, mode, patterns, shapes, correlations, autocorrelations, frequency characteristics, trends, variation, spacing, etc. The extracted feature may be for a particular time frame, or analysis window 214, within the time-series data. For example, a first (ten second) section of the time-series data 202-210 may be selected for analysis by the detectors 104. An example analysis window 214 is illustrated by the dotted lines in FIG. 2. In general, the analysis window 214 may include any portion of the time-series data streams 202-210. Each detector 104 of the processing system 114 may extract a particular feature of one or more of the time-series data 202-210 for that ten second section. In one instance, the extracted feature may be derived or calculated from the raw data of the time-series, such as a mean value of the data within the section being analyzed. In another instance, the feature may be a portion of the raw data as extracted by the detector. For example, the time-series data may include a video feed and the detector 104 may extract a portion of a video component, a portion of the audio component, or some image analysis of the video component to obtain the feature of the time-series data 202-210. The analysis window, after extraction by the detectors 104, may be adjusted to a second time frame, such as another ten second portion of the time-series data. The second time frame may include some portion of the data included in the first time frame. In this manner, the analysis window may slide along the time-series data to encompass different portions of the data streams 202-210 for analysis.

Some detectors 104 of the processing system 114 may extract corresponding features from a single data stream, such as data stream 204. For example, for each analysis window 214, the detector may obtain an average of the values of the data stream 204 during the analysis window 214 timeframe. As explained in more detail below, the extracted feature of the time-series data 210 may be provided to one or more classifiers 106. Further, some detectors 104 may extract the same feature for multiple data streams 204-210. For example, a detector 104 may obtain the average of the values for each of the data streams 202-210 provided to the processing system 114. Each extracted average feature may therefore be provided to the classifiers 106 of the system 114. In still other examples, the detectors 104 may extract features of combined data streams. For example, a detector 104 may obtain a mean value for the raw data values of a first data stream 202 combined with a second data stream 204 for the analysis window 214. In this manner, the detectors 104 may extract features from any number of the data streams 202-210.

Each of the detectors 104 of the processing system 114 may be configured to extract a particular feature of one or more of the data streams 202-210, including passing through the raw data of the data streams 202-210. The number and types of detectors 104 utilized by the processing system 114 may be invoked, selected, configured, or otherwise determined by the processing system. In one instance, a baseline of detectors 104 may be selected during initial configuration of the processing system 114 and may be based on the application for which the processing system is to be used. The selected detectors 104 may then be invoked by the processing system 114 to extract the corresponding data features from the time-series data 102 provided to the system. In one example, the processing system 114 may be used in a manufacturing environment to predict conditions or outputs of components of the environment and particular detectors 104 may be initially selected for use by the system. In another example, the processing system 114 may be used to analyze operations of a network (such as traffic flow, load, transmission speed, etc.) such that other detectors 104 may be initially selected for use by the system based on network analysis. The detectors 104 of the system 114 may be stored and obtained from a detector library 108. The detector library 108 may be configurable to add new detectors, alter detectors, and/or delete detectors for use by the system 114. Alterations to the detector library 108 may be done remotely via a network connection to the processing system 114 or via a user interface to the system. The number and type of detectors 104 used by the processing system 114 may also be configurable, in some instances based on feedback information provided to the system on the accuracy of an output of the system, as discussed in more detail below.

As mentioned, the detectors 104 may provide the extracted data to one or more models, or "classifiers" 106. In general, the classifiers, a type of machine learning model, processes the extracted feature data received from the detectors 104 in various configurations and generate a prediction or likelihood of the indicated occurrence. For example, a classifier 106 may process the output of a particular detector 104 and generate an output of a prediction of an event based on the feature of the time-series data 202-210 extracted by the detector. In other words, the classifier 106 may output an indication of the likelihood that the extracted data from the detector 104 predicts the occurrence of a condition or event of the monitored system. Examples and operations of some classifiers 106 are discussed in more detail below. In some instances, a classifier 106 may generate the prediction output 112 based on an extracted feature data from one detector 104 of the system 114. In other instances, the classifier 106 may generate the prediction output 112 from the extracted feature data from multiple detectors 104. In still other instances, the classifier 106 may utilize less than all extracted feature data from one or multiple detectors 104 and may apply various weighted values to the extracted data to generate the prediction output 112.

The processing system 114 may also utilize multiple classifiers 106 and output the most accurate classifier or may combine the outputs from the multiple classifiers. In some instances, one or more weighted values may be applied to the outputs of the classifiers to improve the accuracy of the prediction output 112. Such weighted values may be based on feedback or other information corresponding to the accuracy of a predicted outcome of the monitored system from which the time-series data 202-210 is received. The output of the processing system 114 may thus be based on the weighted outputs of the multiple classifiers 106 of the system, either as a combination of the outputs corresponding to the weighted values or a selection of the output of one classifier or classifiers over other classifiers based on the weighted values. In this manner, the classifiers 106 provide the prediction output 112 of the processing system 114 based on the extracted feature data obtained from the time-series data 102 by the detectors 104.

Similar to the detectors 104 of the system 114, the number and types of classifiers 106 utilized by the processing system 114 may be selected, configured, or otherwise determined by the processing system. In one instance, a baseline of classifiers 106 may be selected during initial configuration of the processing system 114 and may be based on the application for which the processing system is to be used. The classifiers 106 of the system 114 may be stored and obtained from a classifier library 110. The classifier library 110 may be configurable to add new classifiers, alter classifiers, and/or delete classifiers for use by the system 114. Alterations to the classifier library 110 may be done remotely via a network connection to the processing system 114 or via a user interface to the system. The number and type of classifiers 106 used by the processing system 114 may also be configurable, in some instances based on feedback information provided to the system on the accuracy of an output of the system.

The prediction output 112 may include some indication of a likelihood of an event or condition of the monitored system occurring based on the time-series data 102. In one instance, the prediction output 112 may include an alert of the potential of the event occurrence, perhaps displayed on a display device or via a user interface. The alert may be based on a prediction value exceeding a threshold value. For example, the prediction output 112 may indicate an 80% probability of the occurrence of the noted condition or event of the monitored system based on the time-series data 102. A user interface may provide the probability value and, in some instances, provide an alert of the likelihood of the event or condition occurring. The alert may be triggered for probabilities that exceed a threshold value, such as 75%. In this manner, the prediction output 112 may provide an indication of a predicted event or condition of the monitored system based on the time-series data 102. In general, the prediction output 112 may be any value or indicator associated with the predicted occurrence of the condition or event as determined by the output of the classifiers 106 of the processing system 114.

In some instances, the prediction output 112 may be utilized to adjust or alter the monitored system in response to the indication of the condition or event. For example, output 112 of the processing system 114 may indicate a high likelihood of a failure of the monitored system, such as due to high operating temperature or other metrics that may exceed a threshold value. The output 112 may be transmitted to a controller or other device associated with the monitored system and one or more aspects or parameters of the monitored system may be adjusted in response to the output 112. For example, a temperature controlling device associated with the monitored system may be adjusted to lower the temperature of the monitored system in response to the prediction output 112. Other adjustments to a monitored system may also occur in response to the output 112, such as changes to power consumed by the monitored system, changes to one or more inputs to a processing device, changes to environmental control devices or systems, changes to amounts and/or kinds of ingredients input to a processing machine, and the like. In general, any component or aspect of a monitored system may adjusted, changed, altered, etc. based on the prediction output 112, in some instances to prevent the occurrence of the event or condition associated with the A portions as described above.

Feedback can be provided to improve performance of the processing system 114. For example, the prediction output 112 may indicate that a condition or event is likely to occur. A successful or failed prediction may be provided as a feedback 116 to the system 114. In one instance, a user of the system 114 may identify a success or a failure 116 of the predicted condition. In another instance, a sensor or other monitoring system or device may monitor for the occurrence of the event or condition and provide the feedback to the processing system 114. For example, the event being predicted may be a forced shutdown of a device due to overheating. A sensor or program may be connected to or otherwise associated with the device to detect a forced shutdown and may provide feedback 116 in the form of an accurate prediction of the shutdown occurrence or incorrect prediction of the occurrence. Further, the feedback 116 may include a false negative, a false positive, a true negative, and/or a true positive. Feedback may be provided continuously in response to prediction outputs 112 from the system 114. Furthermore, the feedback information 116 may be utilized by the system 114 to improve the detectors 104 and/or classifiers 106. For example, users of the processing system 114 may annotate or identify incorrect predictions, or reinforce correct predictions, as feedback information 116. The feedback 116 may accelerate learning by the system 114 as to the most accurate combination of extracted feature data and the most accurate combination of classifiers 106 to improve the discerning capability of the processing system 114 and reduce erroneous classification results or other prediction outputs 112.

Figure 3:
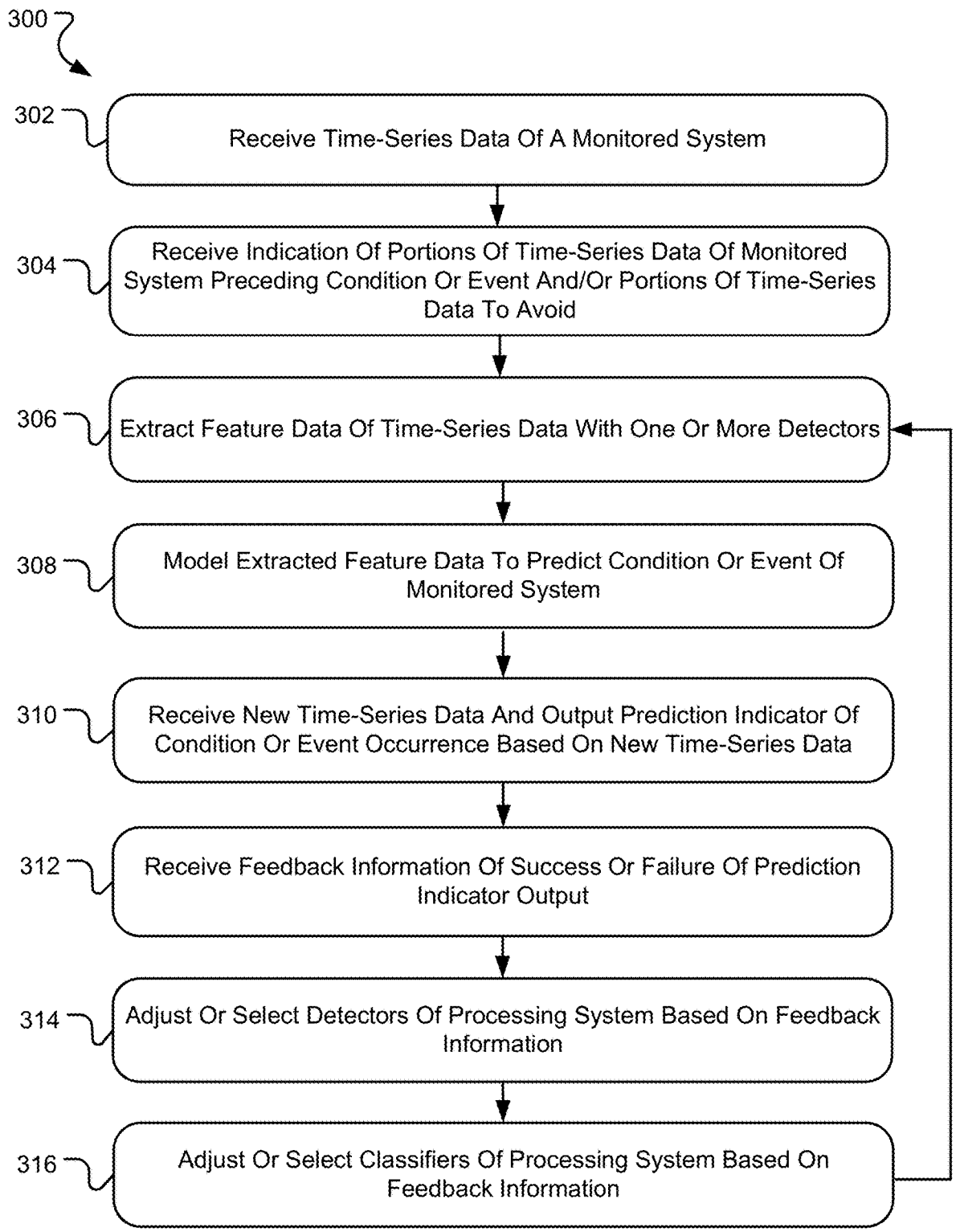
FIG. 3 is a flowchart of a method for generating a prediction output based on time-series data and adjusting a processing system based on a feedback indicator of a success of the classification output.

FIG. 3 is a flowchart of a method 300 for generating a prediction output based on time-series data and adjusting a processing system based on a feedback indicator of a success of the prediction output. In general, the operations of the method 300 may be executed by the processing system 114 described herein to process time-series data from one or more sources associated with a monitored system. The operations of the method 300 may be executed through one or more programs, one or more hardware components of the processing system 114, or a combination of both hardware and software components. It should be appreciated that more or fewer operations may also be executed by the processing system 114 than those illustrated in the method 300 of FIG. 3.

Beginning in operation 302, the processing system 114 may begin receiving time-series data from the monitored system. In some instances, the time-series data may be obtained from memory such that the data is received from the memory, while in other instances the data may be real-time inputs provided by one or more sensors associated with the monitored system. As discussed above, such data may include continuous time-series signals, a combination of continuous and categorical (discrete) time-series signals, and/or a multitude of unstructured data such as written operator logs, operating procedures, etc., may be mined and used in combination with continuous and discrete signals. In some instances, time-series data can itself be multi-dimensional, meaning, each time-stamp is associated with not just one value, but a set of values of arbitrary nature. In some instances, the time-series data received in operation 302 may comprise training data used to train the processing system 114. More particularly, during a training phase of the processing system 114, stored or real-time data may be provided to the system to "train" the system, such as selecting a type/number of detectors 104 and/or a type/number of classifiers 106 that provide the most accurate prediction outputs 112. Once trained, the processing system 114 may be applied to real-time data, as explained below, to predict the occurrence of an event or condition based on the data as the data is provided to the system 114. Thus, one or more of the operations described herein may be applied either to training time-series data and/or live time-series data.

In operation 304, the processing system 114 may receive one or more indications of a portion or portions of the time-series data, also referred to herein as "classification data", for prediction analysis. A portion of the time-series data may include a single point in time or may be defined by a time frame that includes a start time and a stop time within the time-series data. For example, portions 216 of the time-graphed data of FIG. 2 may be indicated as those portions corresponding to or preceding an event or condition to find. In one implementation, a user of the processing system 114 may provide an indication, in some instances via a user interface to the system, of a sequence of time series data elements that precedes a condition or event of interest of the monitored system, such as an equipment failure or the like. For example, the user may indicate a start time and an end time within the timespan of the time-series data to define the portion of interest. An example of such an "A" ("FIND") period 216 is illustrated in the time-series data graph 200 of FIG. 2. The "A" period may include the data from each stream of data within the time-series data between the start time and the stop time of the identified period. For example, "A" periods 216 of FIG. 2 may be generated or provided for the presented time-series along the series timeline 212. Shaded areas 220 in grey indicate the portions of the data streams 202-210 corresponding to the selected or generated "A" periods. That is, each "A" period 216 may include the data of the data streams 202-210 included in the shaded regions 220. As explained in more details below, the portions 220 of the time-series data streams 202-210 corresponding to the "A" periods 216 may be used to train a classifier to search any time-series data for similar characteristics of the data to identify a potential occurrence of the "A" period within the data. In one instance, a user may seek to FIND an "A" period that indicates such a condition or event of the monitored system and manually, via a user interface, indicate one or more "A" periods 216 which precedes the event or condition. For example, an interface may allow a user to mark a start and end of a time window for each data series 202-210 or all data series, with the various data series aligned and displayed based on time. In another example, a user may mark a discrete time window for a discrete time series data stream and the system marks the same time window for other data series of interest. In other examples, only a point of the occurrence of the condition or event may be identified within the time-series data 202-210, and "A" 216 may be automatically determined by the processing system 114. In another example, a user may identify an "A" period and the processing system 114 may suggest other portions of the time-series data 202-210 corresponding or similar to the selected portion. In still another example, "A" periods 216 may be automatically identified based on an output of a sensor of the monitored system. In yet another example, "A" periods 216 or any other classification data may be generated by the processing system 114 unsupervised or automatically through an analysis of the trends or features of the time-series data. Upon occurrence of a condition or event as indicated by the sensor, the processing system 114 may identify the "A" period 216 immediately preceding the indicated condition.

In a similar manner, a "B" period ("AVOID" period) 218 indicating conditions of the monitored system not indicative of the event to be recognized, representing the state of the system during normal operation and/or after the failure has been repaired may be optionally identified, either manually or automatically, to further inform the method. Typically, a B period will be different from an A period although it is possible overlap. In effect, "A" and "B" can be explicitly characterized and differentiated between by the detector-based system 114. As shown in FIG. 2, areas 222 represent the portions of the time-series data streams 202-210 included in the "B" periods, similar to the "A" periods 220 above. Thus, the data within the "B" period portions 222 may be avoided by the processing system 114 as data characteristics that are not included in the "A" periods and should be classified, by the system, as characteristics of the data not in an "A" period 216. Such capability facilitates accurate identification of the desired systems states (e.g., the FIND periods 216). Subsequent aggregation of the identified states into a resulting condition may, for example and without imputing limitation, be used in manners that enable material improvement to the operation of the respective process, as described in the embodiments.

In some embodiments, offline or unsupervised analysis may be performed to generate FIND periods 216 and/or AVOID periods 218 or train machine learning models for use with the processing system 114. In some embodiments, streaming data can be used for real time monitoring. In yet other embodiments, a combination of offline analysis and real time analysis and/or monitoring may be used. Further, for the sake of simplicity, examples contained herein focus on distinguishing between an "A" and a "B" set for time-series data. However, the same framework can be applied to handle multiple labels, with no restriction on the number of such labels to identify and/or distinguish between them.

In operation 306, feature data from the time-series data may be extracted by one or more detectors 104 of the processing system 114, as described above. As explained, the features of the time-series data obtained by the detectors may be the values of one or more of the data streams of the time-series data and/or derivations of the data streams of the time-series data, such as a maximum value, a minimum value, an average value, a mean value, and the like. Such data features may be obtained from an analysis window of the time-series data, such as over a ten second span of the time-series data. The detectors 104 may be invoked by the processing system 114 to extract abstract features from the time-series data 202-210 using any one or combination of a multitude of methods, including, for example and without imputing limitation, symbolic aggregate approximation, autoencoders, and various deep neural network architectures. Such abstract features may then replace or be combined with intrinsic and explicitly derived features. Furthermore, the methodology provides for an arbitrary collection of subordinate detectors 104, which are invoked by the invention to work in aggregate to meet the objectives. Parameters of each such detector can be exposed to the user, be determined by the detector itself, or by the parent algorithm (e.g., as discussed above). As a result, discriminating features between time periods over a multivariate set of signals and what detectors to use to make those determinations may be learned.

Detectors 104 and detector parameters may be selected or invoked through various processes. As examples, a genetic algorithm may be executed by the processing system 114 to iterate towards ever-improved results, or a matrix of trials may be used, first broadly over the full range of values for all parameters or a subset, and then repeated iteratively at finer granularity, zoomed in on regions of better performance. In some embodiments, detectors 104 or detector parameters may be invoked for data feature extraction or configured by rule-based systems applying a priori knowledge of the signals and/or what the signals measure. For instance, based on the data or the system being measured, frequency analysis may not be relevant or the characteristic of interest can happen at any offset or bias and so the median of the signal is to be ignored, based on experiential knowledge or the like. In another example, a "resting" measurement, such as power consumed or operating temperature, may be assumed by a detector or the processing system 114 and a steady state of the system may be characterized as not varying too much in one direction or another. In some embodiments, a variation technique can be applied, whereby for a given set of parameters and detectors, one item is altered to assess its ability to discriminate between A and B, and then iterating repeatedly through all other detectors 104 and parameters towards a maximum performance.

As also explained above, all detectors 204 may be used in generating predictions. In other instances, the detectors 204 to use are prescribed by a user and invoked by the processing system 114 to extract the features of the time-series data 102. In yet other instances, the processing system 114 determines which subset of detectors 204 are relevant for the application and invokes the determined detectors 204 accordingly.

The extracted feature data may be provided as inputs to one or more classifiers 106 of the processing system 114. The classifiers 106 may process the feature data provide by the detectors 104 to model, in operation 308, the extracted feature data and determine a correlation of the extracted feature data to the indicated "A" period. In other words, the classifier 106 may analyze the feature data provided by the detectors 104 to determine how predictive the data is to the occurrence of the "A" period or how similar the extracted data is to the "A" period. For example, the classifier 106 may be a model trained to determine the features of the time-series data (such as an average value, a mean value, a particular data streams, etc.) that best characterizes the identified "A" portion discussed above. As some data features may be more indicative of the "A" period than other features, the classifier 106 may select the most accurate data features for use in identifying the occurrence of an "A"-like period in the time-series data. In other words, the processing system 114 may determine the best or more dispositive data feature in identifying an "A" period and select the detectors that provide said data features to the classifiers 106. In this manner, selection or emphasis on certain detectors may favor some types of data features over others in the processing system 114.

The classifiers 106 of the processing system 114 may output a prediction of a likelihood of a condition or event of the monitored system in the form of an identification of a portion of the time-series data that is similar to the "A" period. Broadly speaking, the processing system 114 may determine which extracted feature data is predictive of the event or condition occurring and provide that feature data to one or more classifiers 106. Thus, in one instance, the processing system 114 may determine if the extracted feature data from the time-series data is likely to indicate or detect an "A" period 216. The processing system 114 may also determine if the extracted feature data from the time-series data is likely to indicate or detect a "B" period 218. For example, the processing system 114 may determine a classification or cluster of extracted data points that represent or are "close" to the "A" periods 216 and a classification of extracted data points that represent or are close to the "B" periods 218. For newly extracted feature data, the processing system 114, in the form of the classifier 106, may determine whether the data is closer to the classification for the "A" periods 216 or the "B" periods 218 and classify the data point accordingly. In this manner, the classifier 106 may identify those extracted feature data points that are indicative of the "A" periods 216 and/or the "B" periods 218.

The classifiers 106 of the processing system 114 may include one or more parameters or characteristics that configure various aspects of the classifier. For example, a "greediness" characteristic of a classifier 106 may affect how the classifier determines which extracted data points are included in a classification. More particularly, time-series data and/or extracted feature data may, in general, include noise, and not be well-behaved. Noise may include, for example and without imputing limitation, measurement error, drift, interference, gaps, time-stamp irregularity, lossy data compression, bias, etc. Classifiers 106 may be configured to avoid classifying the noise data including in a time-series stream into a classification through a greediness setting or configuration of the classifier. For example, a classifier 106 may determine or be assigned a level of greediness for the classification of featured data into an "A" period 216 or "B" period 218 in order to compensate for noise in the data and avoid including that noise data points into the "A" period. In general, for a given set of feature data, a low value of greediness enforces a stricter matching requirement for classification of the feature data (whether the input stream of data or a derived aspect of one or more of the data streams) in the "A" category 216. This can address the characteristics of noise and may also be applicable towards including (or excluding) other system states. In some cases, the noise in the system may actually be approximated and included as a feature used to characterize the "A" and/or "B" periods.

Figure 4A:
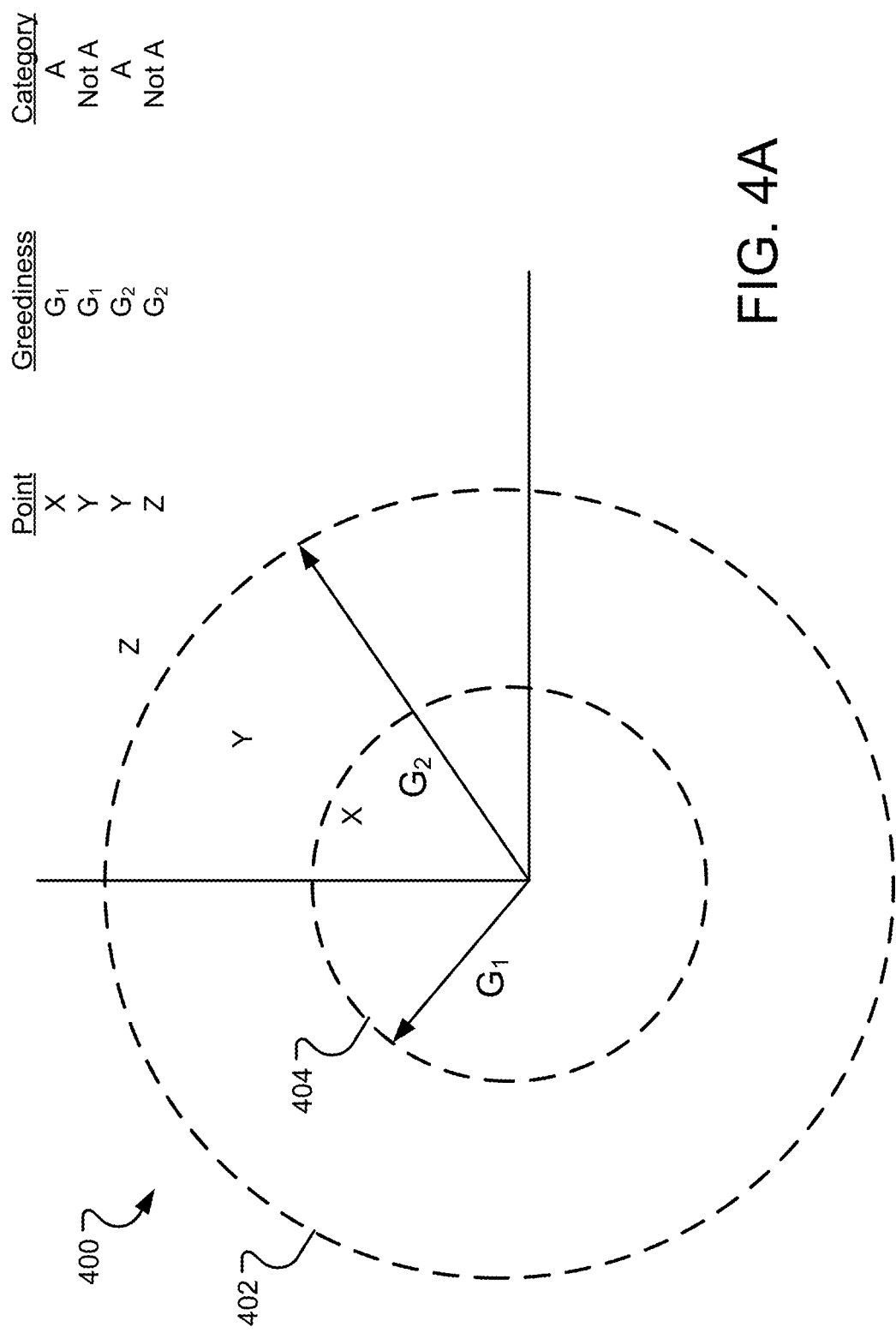
FIGS. 4A and 4B illustrate graphs and tables of the greediness characteristic or parameter of a classifier of a processing system for time-series data.

FIG. 4A illustrates a graph and table of determining the greediness of a classifier 106 of the processing system 114. The classifier 106 is but one example of a type of classifier that may be used in the processing system 114 to determine the predictiveness of an extracted feature data point. In the example shown, extracted feature data points X, Y, and Z may be graphed in the graph 400. In addition, two levels of greediness, greediness level $G_1$ 404 and greediness level $G_2$ 402, with $G_2$ being greater (or more greedy) than $G_1$ are also graphed. In general, a higher value of greediness applied by a classifier 106 may result in a greater attractive force for pulling in or including data points into the "A" periods 216 and/or the "B" periods 218. Three example data points are illustrated on the graph 400 to illustrate this point, namely data points X, Y, and Z. A classifier 106 operating with a greediness value of $G_1$ 404 would include point X into a classification, such as an "A" period 216 or the "B" period 218. Points Y and Z would, however, not be included in the classification as those points lie outside the greediness value for the classifier 106. However, a classifier 106 utilizing a greediness value of $G_2$ 402, points X and Y would be included in the classification, with point Z remaining outside of the classification. Thus, different classifiers 106 of the processing system 114 may have different levels of greediness to classification particular data points into an "A" period 216, a "B" period 218, or in neither period. The level of greediness for the classifier 106 may affect the predictiveness of the classifier as including too many data points, too few data points, or an effective number of data points to provide a predictive model of the extracted feature data.

Figure 4B:
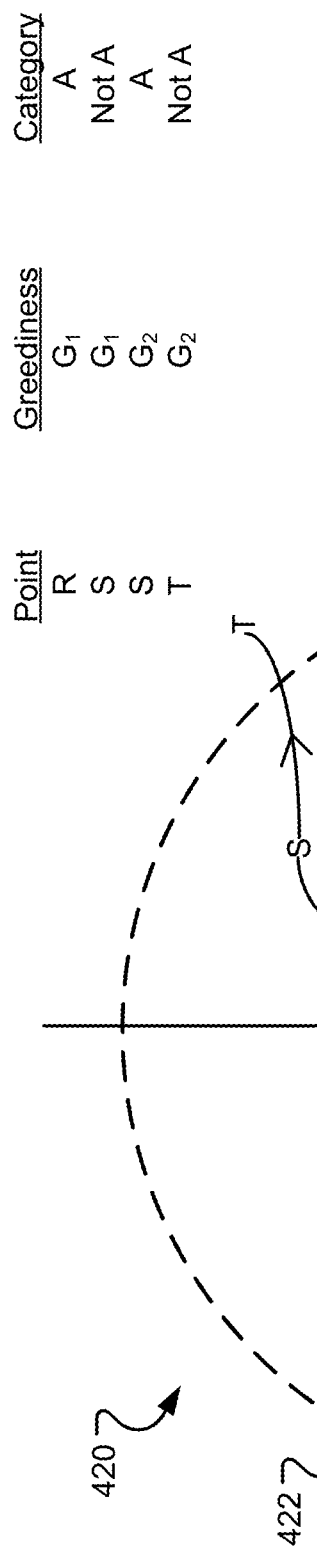

The greediness of a classifier 106 may also determine the addition of a time sequenced, data point into a classification. In particular, FIG. 4B is a graph 420 and table illustrating a greediness characteristic of a classifier 106 of the processing system 114 for a time sequence of a multivariable data series. The graph 420 of FIG. 4B includes a plot of a time sequence of a multivariable series R→S→T depicted in feature space in which R occurs is at time to, S is at time t1 (>10) and T is at time t3 (>t2). The time-series data R→S→T is plotted on graph 420. As above, data point R may be assigned to set "A" for a classifier 106 with a greediness characteristic of $G_1$, with data points S and T not assigned to "A". However, with a greediness characteristic of $G_2$ (>$G_1$), data points R and S may be assigned to "A", while data point T is not assigned to "A". In this manner, the greediness factor of a classifier 106 may determine which data points are included in a classification (or the "A" group 216 or the "B" group 218).

In some instances, a common greediness parameter may be implemented for all classifiers 106 of the processing system 114. In other instances, each classifier 106 may have its own greediness characteristic or a combination of individual and global greediness parameters may be used.

The classifiers 106 of the processing system 114 may utilize various distance metrics for classification of time periods prior to returning a result condition. Accordingly, the features of a searchable time period can be quantified and compared to the features of "A" and/or "B" periods within a multidimensional space defined as having dimensionality that is proportional to the quantity of features used to characterize the time periods. Within such a space, the locations of "A" and/or "B" periods may be represented as centroids of data point-classifications, wherein the individual points are mapped using coordinates defined by values of the features. Once reference period centroid locations are determined, the distances to all other searchable periods may then be computed using any one of a multitude of distance metrics, or a combination of metrics. Examples of such distance metrics may include, without imputing limitation, Euclidean, Manhattan, Chebyshev, Minkowski, etc. In one embodiment, a Mahalanobis metric can be used to compute distances between periods to impose "feature regulation", whereby the influence of features that contribute highly to classification are levered up, and features that poorly differentiate classes are reduced or muted entirely.

In some instances, a simple distance threshold may be sufficient to facilitate classification of a search result. In other instances, an attraction measure is used in conjunction with a distance metric. As a result, the greediness parameter of the classifiers 106, which may be set manually or automatically, may influence the search result. One example of an attraction measure may mimic the mathematical approach for measuring an electrostatic force (e.g., Coulomb's Law). Hooke's Law and Newton's Law of Universal Gravitation are other examples of analogous attraction measures.

Further, a distance metric in conjunction with an attraction measure may be used by a classifier 106 to classify search results as either matching "A" or "B". For example, and without imputing limitation, Newton's Law of Universal Gravitation, $$F = G \frac{m_1 * m_2}{r^d},$$

can be modified where F is still the attractive force, but r is the Mahalanobis distance, d is the dimensionality of the feature space minus one, and the masses m are replaced with values of the greediness parameter. In this model framework, the attractive force is directly proportional to greediness and inversely proportional to distance. In effect, higher greediness values may increase attraction while longer distances inhibit attraction, as discussed above.

In some instances, a supervised or semi-supervised classifier 106 is used to classify periods. In one embodiment, periods are classified into "A" or "B". In other embodiments, periods may each be classified into one of a multitude of classes such as "A", "B", or unknown/unlabeled (neither in "A" nor "B"). In yet another embodiment, periods may be assigned partial probabilistic memberships into multiple classes; for example, a period may be assigned a membership value of 0.4 for "A" and a membership value of 0.6 for "B".

Figure 5:
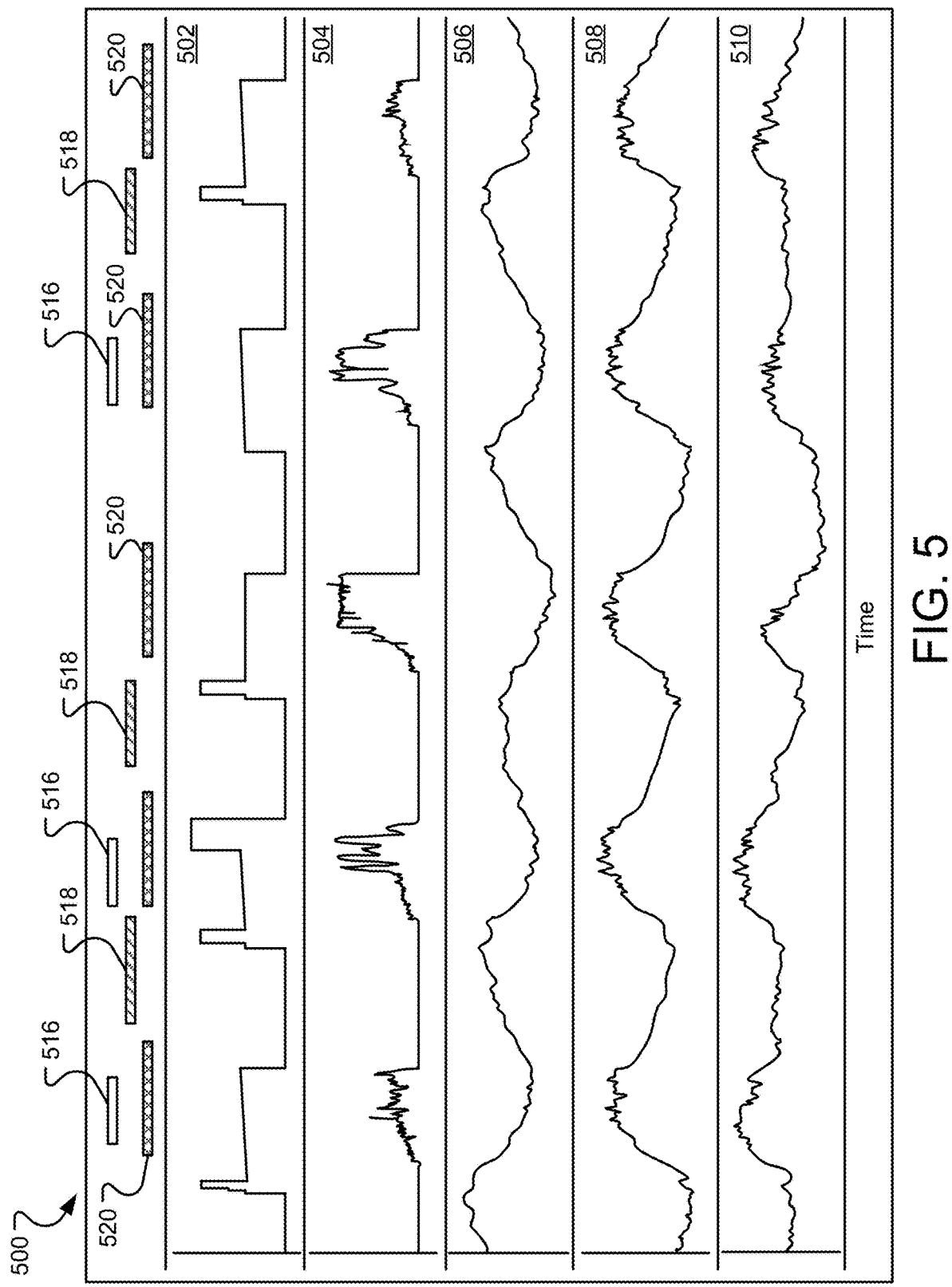
FIG. 5 is a graph of example time-series of data from a monitored system and classification of the time-series data based on one or more classifiers.

Using the classifiers 106, the processing system 114 may identify, during the training portion of the time-series data used to train the classifiers 106, periods within the data that matches or are similar to the "A" time-series periods and avoids the "B" time-series periods. FIG. 5 is a graph 500 of example time-series streams of data 502-510 from a monitored system and the identification of periods 520 of the time-series data that correspond to an identified period 516 based on one or more classifiers. The data streams 502-510 of FIG. 5 are the same as those discussed above in relation to FIG. 2, as are the FIND ("A") periods 516 for the processing system 114 to find, and identified portions "B" 518 for the system to avoid including in the FIND results. One or more classifiers 106 may learn characteristics of the identified "A" portion 516 and. based on the extraction of features from the data streams 502-510 by the detectors 104, identify other portions of the time-series data 502-510 that match or are similar to the FIND period, illustrated in the graph 500 as portions 520. In some instances, the system may identify portions 520 of the time series data that do not include the exact same range of data as the FIND sample or samples, e.g., the identified portion may include more data than the "A" portion 516 provided to the system, which difference is based, at least in part, on a greediness setting associated with the classifiers 106. For example, identified portions 520 include the "A" portions 516 and additional portions before and/or after the "A" portions. This may coincide with a relatively high greediness characteristic of the classifier 106 that errs on the side of including features of the data that are similar to characteristics of the identified "A" portions but may not exactly match the characteristics. The identified portions 520 may also avoid the "B" portions 518. As should be appreciated, other classifiers 106 may identify other portions that may be more or less accurate that the identified portions 520 of the graph 500. Thus, each classifier 106 or group of classifiers may identify, with a corresponding level of greediness, portions of the time-series data 502-510 that correspond to the provided "A" portions 516 and avoid the "B" portions 518.

In one instance, system states that have deviated from the "A" condition 516 can be identified by the classifiers 106. In certain embodiments, a single signal can be used, while in others, multiple time-series signals can be used. In some instances, a threshold for deviation can be determined by applying the method to historical data and making a decision based on historical observation. The threshold can be automatically determined by setting the output (e.g., resulting deviations) to a desired count, frequency, or percentage of time over the historical period. In other examples, statistical measures may be employed. Further, user input in the form of a greediness parameter may be used to determine system state deviation. Many of these, and other, embodiments may benefit from an interactive UI, whereby results over the historical data can be viewed and assessed, and so human-guided iteration may be used to achieve, for example, a desired alerting performance.

The identified portions 520 of the classifiers 106 may be utilized by the processing system 114 to provide a prediction output 112 associated with an occurrence of a condition or event of a monitored system in operation 310 based on newly received (or real-time) time-series data from the monitored system. More particularly, the processing system 114 may continue to receive the time-series data streams after the training period of the processing system, such as those shown in FIG. 6. The time-series data streams 602-610 are a continuation of the data streams 502-510 discussed above and may be provided to the processing system 114 after the system is trained to identify the "A" portions 516. In other words, the processing system 114 may receive a portion of the streamed data 502-510 to perform the training or learning procedures discussed above to identify the characteristics of the streamed data that correspond to the identified portions 516 of interest, or the "A" portions. Once the processing system 114 trains the classifiers 106 of the system to identify the characteristics of the time-series data of the "A" portions 516, the system may analyze the incoming data streams 602-610 following the training portion to predict the occurrence of a condition or event. In the example graph 600 of FIG. 6, the processing system 114 may receive or otherwise access the data streams 602-610 and process the data through the trained detectors 104 and classifiers 106 of the system. The classifiers 106 and/or the processing system 114 may output or identify portions 620 of the new time-series data 602-610 that correspond to the previously identified "A" portions 516. In some instances, these portions 620 may predict the occurrence of an event or condition of the monitored system from which the time-series data 602-610 is received. Based on the indicated portions 620, one or more actions may be taken to prevent the occurrence of the event or condition such that the prediction output 112 provides a monitoring function.

The prediction output 112 may take many forms. In one example, the output 112 may include a measure of membership of data to the "A" and "B" categories. This may be in the form of a distance measure, in some instances. In other examples, a probability estimate may be provided that indicates the likelihood of the indicated portions 620 corresponding to the "A" conditions 516. In still other examples, particular features of the time-series data 602-610 that contribute to the "A" 516 and "B" conditions 518 may be identified and/or ranked. In some instances, the relative contribution of each feature is characterized and a relative impact of both the feature and the time-series signal for a given prediction are characterized. In addition to characterizing and predicting the state of the system, information about key extracted features and signal contributors may be provided. The key extracted features are identified using projections on the appropriate feature space dimension. Causal contributors to the key extracted features may also be identified. In one instance, causal signals are identified using statistical techniques like Granger. In other instances, information theoretic approaches such as entropy are employed to identify key causal signal contributors. This information allows the end user/practitioner to understand the contributors to the identified periods 520, 620.

Returning to FIG. 3, feedback information may be provided to the processing system 114 in operation 312 that indicates a successful or failed prediction of the event or condition. In general, continuous improvement to the detectors 104 and/or classifiers 106 for identifying the "A" set can benefit from incorporating feedback 116 information. In one example, users of the system 114 can annotate or identify incorrect predictions, or reinforce correct predictions. The feedback 116 may accelerate learning by the system 114 and may be utilized to improve the discerning capability and reduce erroneous classification results. In one example, a user of the system 114 may identify a period in which the model has a false negative, false positive, true negative, or true positive. For example, the system 114 may predict an "A" period and the feedback information 116 may indicate if that predicted "A" period occurred or did not occur. Similarly, the system 114 may predict a "B" period and the feedback information 116 may indicate if that predicted "B" period occurred or did not occur. In general, the feedback 116 may be provided in either discrete periods or continuously.

Figure 6:
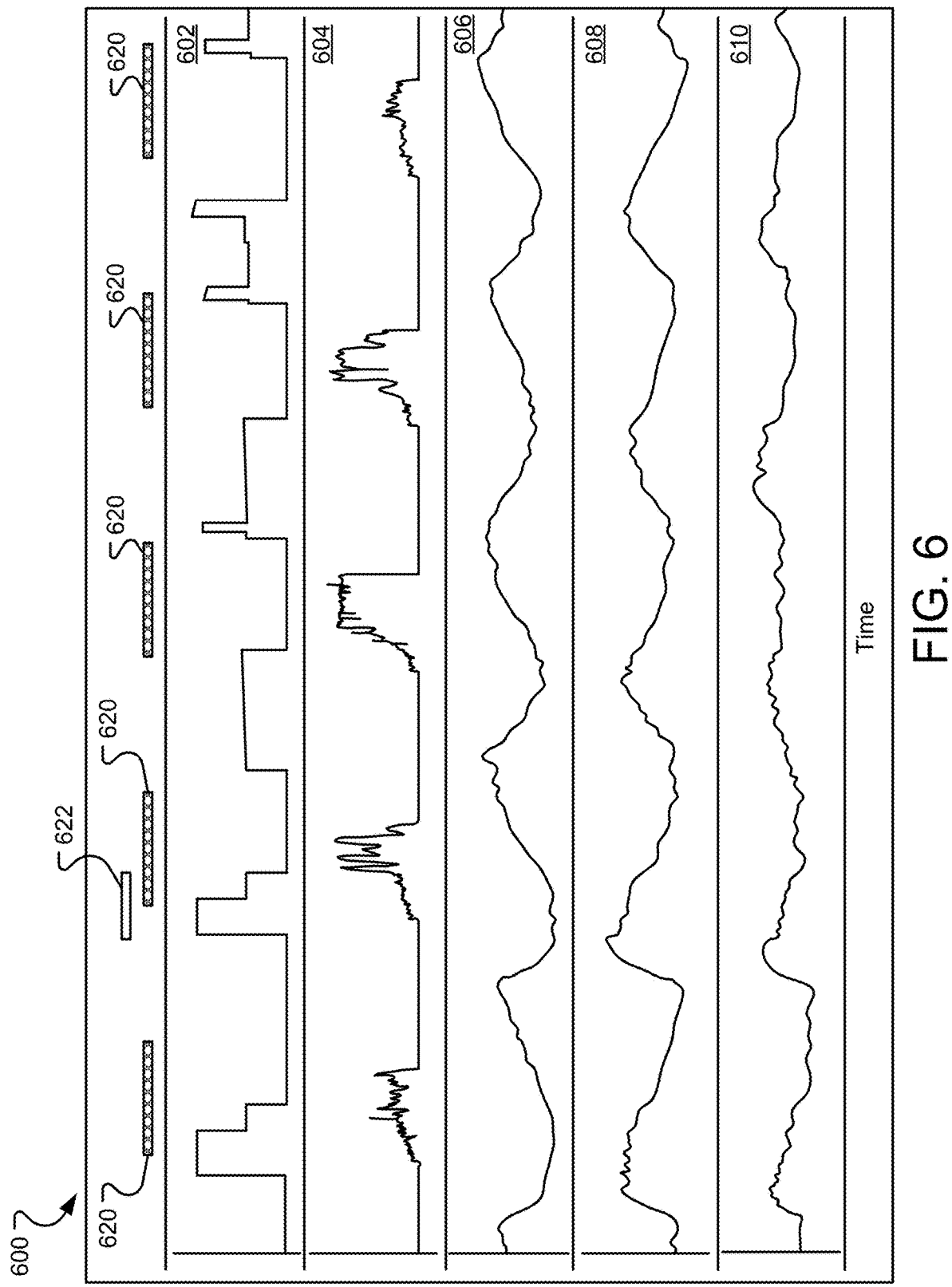
FIG. 6 is a graph of example time-series of data from a monitored system and classified portions of the data associated with an indicated event or condition of the monitored system.

One example of such feedback information 116 is illustrated in the graph 600 of FIG. 6. As mentioned above, the processing system 114 may provide estimated or predicted occurrences 620 corresponding to an identified "A" period. In one instance, however, an "A" period (or the occurrence of a particular event or condition) may occur during period 622. The feedback information 116 may therefore identify that "A" period 622 occurred outside of the portions 620 of the data in which the system 114 predicted the occurrence of the "A" period. In this example, therefore, a period of a false negative ("A" but predicted as not "A") occurred and the feedback information 116 may indicate this false negative. Other misses or successes, such as an accurate prediction of an "A" period or "B" period, may also be included in the feedback information 116. Such information may be provided by a user of the system 114 and/or may be provided by a sensor associated with the monitored system configured to monitor for the occurrence of the condition or event, as explained above. As shown in FIG. 1, the feedback information 116 may be provided to the processing system 114 to improve the performance or accuracy of the system.

In one instance, the processing system 114 may improve, alter, select, configure, etc. a detector 104 or detectors of the system based on the feedback information 116 in operation

314. In one instance, the detectors 104 and/or detector parameters may be optimized such that sensitivity of the output 112 to a detectors' settings is minimized. For example, the detectors 104 selected for use by the system 114 and/or parameters of the selected detectors' may be determined to minimize a combined cost function. The combined cost function trades off performance and sensitivity. In another embodiment, detectors and/or detector parameters may be selected that maximize a robustness of the results to the choice of examples for the "A" set. In other embodiments, a robustness parameter may determine the distinction between categorization in the "B" and unknown/unlabeled.

For example, given the following set:

$$D=\{\text{set of detectors \& detector parameters}\}$$

and a greediness parameter G, performance of the system may be characterized as:

$$P(D;G)=(\text{Predicted } A)/(\text{Labeled } A)$$

and a sensitivity of the system may be characterized as:

$$S(D;G)=(P(D;G+S)-P(D;G-S))/2S$$

For a user selected robustness parameter $\delta$, the combined cost function:

$$\sigma(G,\delta)=(1-\delta)P(D;G)+\delta[-S(D;G)]$$

with an optimal D of the average maximum of $\sigma(G,\delta)$.

As illustrated via the equations above, the robustness parameter may be used as a tradeoff of performance and sensitivity. For the choice of robustness r=0, the choice of detectors 104 and detectors' settings is optimized for performance alone. For a choice of robustness r=1, the choice of detectors 104 and detectors' settings is optimized to minimize sensitivity with regard to greediness G. For 0<r<1, the choice of robustness trades off performance and sensitivity.

As mentioned above, the output 112 of the processing system 114 may include particular features of the time-series data 602-610 that contribute to the "A" 516 and "B" conditions 518, which may be identified and/or ranked. Therefore, in some instances, the system 114 may select one or more detectors 104 from the detector library 108 to apply to the time-series data 602-610 to obtain the identified features of the data that contribute to the accuracy of the output 112. Similarly, the feedback 116 may be used to remove particular detectors 104 (or alter a weighted value associated with the particular detectors) that provides features that do not improve the accuracy of the prediction output 112. In this manner, the number and type of detectors 104, in addition to one or more parameters of the detectors used, may be based on the feedback information 116. In one instance, this adjustment to the detectors 104 may occur without additional inputs from a user of the system 114.

Returning to FIG. 3 and operation 316, the processing system 114 may adjust certain classifiers 106 used by the system, remove classifiers from use, or obtain additional classifiers from the classifier library 110 for use in classifying the extracted feature data. For example, the system 114 may determine, based on the feedback information 116, that a particular classifier 106 of the system is the most accurate in predicting the "A" periods and adjust a weighted value applied to the output of that classifier, remove other classifiers from the output, and/or adjust one or more settings of the classifier. In one instance, a greediness parameter or characteristic of a classifier 106 may be adjusted based on the feedback information 116. As the prediction output 112 of the system 114 may include a combination of outputs from multiple classifiers 106, the system 114 may adjust characteristics of the multiple classifiers based on the feedback information 116 to further improve the predictive quality of the output 112.

Upon adjustment or selection of detectors 104 and classifiers 106 based on the feedback information 116, the processing system 114 may return to operation 306 to extract new feature data from new time-series data using the adjusted or altered detectors. Through this feedback technique, the processing system 114 may receive an indication of the accuracy of the prediction output 112 and adjust the detectors 104 and/or classifiers 106 accordingly to improve the output. This loop process may continue during the entirety of the time-series data to optimize the predictive nature of the system output 112.

In some instances, the time-series data may be received in batches and so results may be likewise categorized in batches. In other instances, a continuous stream of data (e.g., streaming data) is received and a continuous stream of outputs (e.g., FIND periods) can be generated. In other embodiments, a combination of streaming and batch data may be used. Further, different data sources may be combined and data that is not strictly aligned along the indexing dimension (e.g., different time-stamps) can be utilized.

In some instances, learning by the processing system 114 may be completed offline and the learnt model is used for categorizing new data. In other words, the training period discussed above may occur offline and prior to deployment of the processing system 114 to receive continuous time-series data from the monitored system. In other embodiments, the offline model is adapted online as new data and conditions are obtained.

In still further instances of the processing system 114, multiple datasets may be analyzed by applying a model generated from one dataset to another dataset. For example, a model can be built using a set of signals from one asset (e.g., a compressor, etc.), and then applied to a similar set of signals from a different asset (e.g., another compressor, etc.). In other embodiments, the model is built using data from a subset of assets (or datasets, perhaps corresponding to a subset of, e.g., compressors) and applied to all assets. In such an embodiment, the invention provides guidance on the subset of assets to use for model construction.

Multiple modalities may also be handled by the processing system 114. In one embodiment, a model can be constructed for each modal state. In other embodiments, different modal states are combined to generate a unified model. Determination of system modalities can be consumer provided or generated automatically by the invention. For example, a refinery crude column typically operates in different operational modes (e.g., max gasoline, max jet, max distillate, etc.) depending on market economics. Characteristics (e.g., dynamics, lags, process response to disturbances) of the system are different in different operating modes. Each modal state can be handled without imposing additional configuration burden on the consumer.

In one embodiment, the different modal states may be identified, a relevant model for each modal state can be constructed, and the appropriate model at any given time based on the mode can be applied. For example, consider the case of an industrial reactor that produces a desired concentration of product with varying feed blends. A few known feed blends may be used to train a model. In real time implementation, previously unseen feed blends may be encountered. The predictions generated by models corresponding to the known modal states (e.g., known feed blends) are then combined to generate predictions for the previously unseen feed blends.

Figure 7:
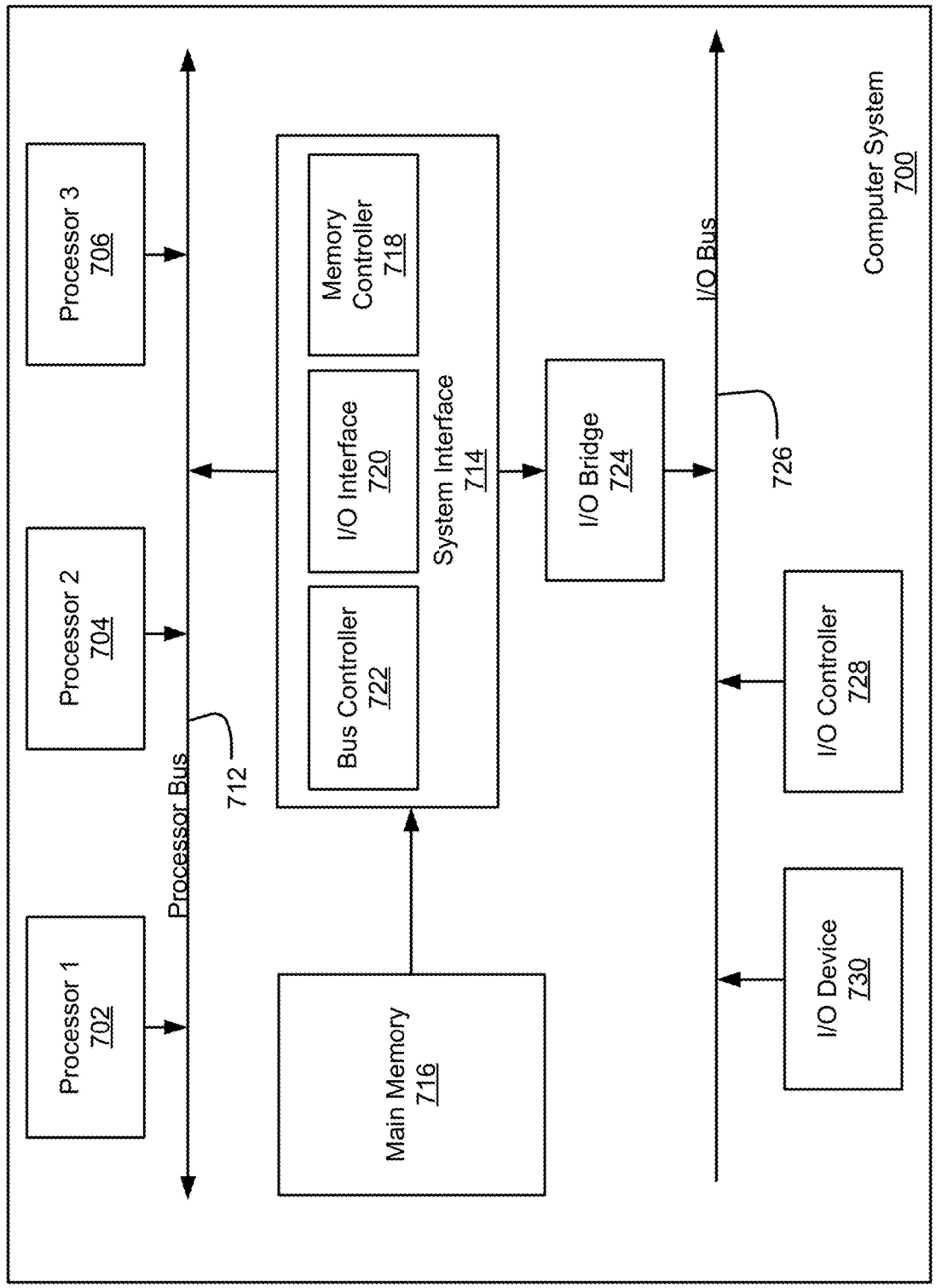
FIG. 7 is a diagram illustrating an example of a computing system which may be used in implementing embodiments of the present disclosure.

FIG. 7 is a block diagram illustrating an example of a computing device or computer system 700 which may be used in implementing the embodiments of the components of the network disclosed above. For example, the computing system 700 of FIG. 7 may be a device executing the processing system 114 discussed above. In one instance, the system 114 may be executed on a physical server, on premise, embedded in a piece of equipment, or in an edge computing system. In other instances, cloud services may be used to execute some or all of the methods described herein. Data sources may reside in different locations. In one embodiment, the data is obtained directly from the sensors. In another embodiment, the data is obtained from one or more historians (e.g., historical data stores). The historians may be physical servers or may be cloud hosted. In some other embodiments, a data lake may serve as the data source. In yet other embodiments, a combination of data sources can be used In general, the computer system (system) 700 includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 714 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one embodiment, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Various modifications and additions can be made to the exemplary embodiments discussed without departing from the scope of the description. For example, while the embodiments described above refer to particular features, the scope of this invention also includes embodiments having different combinations of features and embodiments that do not include all of the described features. Accordingly, the scope of the present description is intended to embrace all such alternatives, modifications, and variations together with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

What is claimed is:

1. A system comprising:
a processing device; and
a non-transitory computer-readable medium encoded with computer executable instructions that when executed by the processing device cause the processing device to:
given a multi-dimensional ordered data series of sensor data of a monitored system and associated classification data for identified portions of the ordered data series, generate a data classification model by iteratively;
automatically selecting, from a library of detectors each for extracting a type of corresponding characteristic of the ordered data series, a plurality of detectors each extracting a different type of a corresponding characteristic of the ordered data series;
automatically selecting, from a library of classifiers, a plurality of classifiers each generating a prediction outcome for identifying a portion of the ordered data series corresponding to the associated classification data, wherein each of the plurality of classifiers is provided the extracted types of corresponding characteristics of the ordered data series determined from the selected plurality of detectors;
determining a relative accuracy of the prediction outcomes from each of the plurality of classifiers to the portion of the ordered data series; and
altering the data classification model based on the determined relative accuracy of the prediction outcomes from each of the plurality of classifiers to the portion of the ordered data series, wherein altering the data classification model comprises selecting a second plurality of detectors from the library of detectors and a second plurality of classifiers from the library of classifiers;
apply a data set of streamed sensor data to the data classification model to identify a portion of the data set of streamed sensor data corresponding to the identified portions of the ordered data series; and
conduct, based on the identified portion of the data set of streamed sensor data, a remedial action of the monitored system.

2. The system of claim 1, wherein the instructions further cause the processing device to:
update the classification data based on prior classified portions of the ordered data series.

3. The system of claim 2, wherein the prior classified portions comprise an annotation of a reinforcement or a correction of an accuracy of a match to the associated classification data.

4. The system of claim 1, wherein to automatically selecting the plurality of detectors comprises at least one of invoking a detector, deleting a detector, adding a detector to a detector library, or combining an output of the plurality of detectors.

5. The system of claim 1, wherein to automatically selecting the plurality of classifiers comprises at least one of altering a parameter of the classifier, invoking a classifier, deleting a classifier, adding a classifier to a classifier library, or combining an output of the plurality of classifiers.

6. The system of claim 1, wherein the ordered data series is time series data and the classification data corresponds to a discrete sequence of the time series data.

7. The system of claim 6, wherein the classification data comprises a time period preceding the discrete sequence within the ordered time series, the time period predictive of a point of interest in the time series data.

8. The system of claim 1, wherein an identification of the classification data is received via a user interface.

9. The system of claim 1, wherein at least a portion of the classification data is based on:
identification of one or more characteristics corresponding to the identified portions of the ordered data series; and
matching the one or more characteristics to the ordered data series.

10. The system of claim 9, wherein matching the one or more characteristics to the ordered data series comprises at least one of a determination of a reinforcement or a correction of an accuracy of a match to the associated classification data.

11. The system of claim 9, wherein identification of one or more characteristics and matching the one or more characteristics to the ordered data series occurs during an unsupervised learning period.

12. The system of claim 1, wherein the classification data is associated with a portion of interest of the ordered data series.

13. The system of claim 1, wherein the classification data is associated with a portion of disinterest of the ordered data series.

14. The system of claim 1, wherein the classification data is associated with a portion of interest and a portion of disinterest of the ordered data series.

15. The system of claim 1, wherein the ordered data series comprises a historical data series comprising stored data values or a real-time data series comprising one or more data streams comprising real time data values.

16. The system of claim 1, wherein the classifier comprises one or more of an empirical model, a first principles model, or a rules-based model.

17. The system of claim 1, wherein the instructions further cause the processing device to:
receive an indication of a greediness value associated with the classifier, the greediness value associated with classifying the portions of the ordered data series as corresponding to the associated classification data.

18. The system of claim 17, wherein the instructions further cause the processing device to:
receive an indication of a robustness value associated with the classifier, the robustness value associated with classifying the portions of the ordered data series to minimize sensitivity to varying indications of greediness.

19. A method for classifying a behavior of a system, the method comprising:
obtaining classification data for one or more identified portions of a multi-dimensional ordered data series of sensor data of a monitored system, the classification data corresponding to a point of interest within the ordered data series;
generating a data classification model by iteratively,
automatically selecting, from a library of detectors each to extract a type of corresponding characteristic of the ordered data series, a plurality of detectors to extract a different type of a corresponding characteristic of the ordered data series;
automatically selecting, from a library of classifiers, a plurality of classifiers each generating a prediction outcome to identify portions of the ordered data series corresponding to the associated classification data, wherein each of the plurality of classifiers is provided the extracted types of corresponding characteristic of the ordered data series determined from the selected plurality of detectors;
determining a relative accuracy of the prediction outcomes from each of the plurality of classifiers to the portion of the ordered data series; and altering the data classification model based on the determined relative accuracy of the prediction outcomes from each of the plurality of classifiers to the portion of the ordered data series, wherein altering the data classification model comprises selecting a second plurality of detectors from the library of detectors and a second plurality of classifiers from the library of classifiers; and
applying a data set of streamed sensor data to the data classification model to identify a portion of the data set of streamed sensor data corresponding to the identified portions of the ordered data series; and
conducting, based on the identified portion of the data set of streamed sensor data, a remedial action of the monitored system.

20. The method of claim 19, wherein selecting the plurality of detectors comprises at least one of selecting an additional detector from a detector library, combining an output of a plurality of detectors, or combining an output of the plurality of detectors and an output of the additional detector.

21. The method of claim 19,
wherein selecting the plurality of classifiers comprises at least one of altering a parameter of the classifier, selecting an additional classifier from a classifier library, combining an output of a plurality of classifiers, or combining an output of the classifier and an output of the additional classifier.

22. The method of claim 19, wherein the ordered data series comprises a historical data series comprising stored data values or a real-time data series comprising one or more data streams of real time data values.

23. The method of claim 19, wherein the ordered data series comprises streamed data from a plurality of sensors associated with a monitored system, the remedial action comprising:
adjusting, based on the classified portions of the ordered data series matching the associated classification data, an operational state of the monitored system.

24. The method of claim 23, wherein the adjustment of the operational state of the monitored system occurs to prevent an operational event of the monitored system corresponding to the point of interest.

25. The method of claim 23 further comprising:
receiving feedback information from the plurality of sensors associated with the monitored system, the feedback information indicating the operational state of the monitored system.

26. The method of claim 23 wherein the classified portions of the ordered data series matching the associated classification data indicates a predicted operational state of the monitored system.

27. The system of claim 1 wherein the data classification model communicates with a sensor of a system to monitor an operational state of the system.

28. The system of claim 27 wherein the data classification model indicates a prediction of a future operational state of the system based on receiving an output of the sensor of the system.

* * * * *